United States Patent [19]

Berthold et al.

[11] Patent Number: 4,954,804
[45] Date of Patent: Sep. 4, 1990

[54] ROTARY POTENTIOMETER

[75] Inventors: Gottfried Berthold, Reutlingen; Rudolf Limpert, Salz; Friedhard Fehr, Lauter, all of Fed. Rep. of Germany

[73] Assignee: Preh-Werke GmbH & Co. KG, Saale, Fed. Rep. of Germany

[21] Appl. No.: 318,333

[22] Filed: Mar. 3, 1989

[30] Foreign Application Priority Data

Mar. 4, 1988 [DE] Fed. Rep. of Germany ....... 3807005

[51] Int. Cl.⁵ ............................................. H01C 10/32
[52] U.S. Cl. ..................................... 338/162; 338/163
[58] Field of Search ............... 338/162, 160, 199, 163, 338/170, 174

[56] References Cited

U.S. PATENT DOCUMENTS

| 2,665,355 | 1/1954 | Van Alen et al. | 338/162 X |
| 3,319,209 | 5/1967 | Reyenga | 338/162 |
| 4,355,293 | 10/1982 | Driscoll | 338/162 X |
| 4,430,634 | 2/1984 | Hufford et al. | 338/199 X |
| 4,568,798 | 2/1986 | Ambros et al. | 178/18 |
| 4,621,250 | 11/1986 | Echasseriau et al. | 338/162 |
| 4,623,868 | 11/1986 | Pitcher | 338/162 X |
| 4,841,626 | 6/1989 | Griebel | 338/199 X |

FOREIGN PATENT DOCUMENTS

| 0112975 | 9/1983 | European Pat. Off. |
| 0157666 | 2/1985 | European Pat. Off. |
| 2162853 | 12/1970 | Fed. Rep. of Germany |
| 2317144 | 10/1977 | Fed. Rep. of Germany |
| 3322382 | 1/1985 | Fed. Rep. of Germany |

Primary Examiner—Bruce A. Reynolds
Assistant Examiner—Marvin M. Lateef
Attorney, Agent, or Firm—Wegner & Bretschneider

[57] ABSTRACT

A rotary potentiometer having a cylindrical or partially cylindrical resistance track and at least one electrode pair arranged at the resistance track's edges which are parallel to the cylinder axis. A tap is fixed to an adjusting component which is rotatable around and movable along the cylinder axis. The axial breadth of the resistance track correspondsd substantially to the stroke of the adjusting component along the cylinder axis. At the circumferential edges of the resistance track, at least one second electrode pair is arranged.

10 Claims, 4 Drawing Sheets

ROTARY POTENTIOMETER

BACKGROUND OF THE INVENTION

The invention relates to a rotary potentiometer comprising a cylindric or partially cylindric resistance track whose two edges parallel to the cylindric axis are provided with at least one pair of electrodes applying voltage to the resistance track, and comprising a tap which contacts the resistance track and is fixed to an adjusting component which is rotatable around the cylinder axis.

Such a rotary potentiometer is described in EP No. 0 157 666 A1. With this rotary potentiometer an angular position of a rotatable element, for example a machine part, can be detected. For this purpose the element is coupled with the adjusting component. If a linear movement of the element is to be detected as well, not only a shifting potentiometer but also a complicated coupling mechanism is necessary for transferring the rotation only to the rotary potentiometer and the linear movement to the shifting potentiometer.

DE-AS No. 23 17 144 describes a device for adjusting several resistors by an adjusting lever slewably positioned by means of ball. Thus, shifts of the adjusting lever in xy-direction can be detected, but not movements around its longitudinal axis. A similar device is described in DE-OS No. 21 62 853.

For the detection of rotating and shifting movements arrangements working without contact are known, for example electrodynamic systems such as differential transformers, inductive or capacitive devices as well as pneumatic dynamic pressure arrangements. With such arrangements, however, a lot of wiring is required. In addition, the achievable signal voltages or signal currents are very small in comparison with the distribution voltage or distribution current. This makes such arrangements susceptible to trouble.

SUMMARY OF THE INVENTION

It is an object of the invention to develop a rotary potentiometer of the type described above such that the adjusting component can also carry out and detect linear movements.

According to the invention, this object is achieved with a rotary potentiometer of the type described above by the fact that the adjusting component can be shifted by a stroke axial to the cylindric axis relative to the resistance track, that the axial breadth of the resistance track corresponds to the stroke of the adjusting component, that at least one further pair of electrodes is provided for placement at the two edges of the resistance track running in circumferential direction of the cylinder, and that the two pairs of electrodes are mutually live.

Thus, the adjusting component can detect or carry out movements with a rotating and a linear movement component, the tap taking a corresponding position at the resistance track. By means of the mutual switching of the electrode pair of the edges parallel to the cylinder axis and of the electrode pair of the edges running in circumferential direction the resistance corresponding to the rotating and the linear movement becomes effective at the cycle of the voltage change.

The construction is compact, because few movable elements are required.

It is a further advantage that the maximum value of the voltage sensed at the resistance track is mainly equal to the applied distribution voltage and that the intermediate values make up a corresponding part of the distribution voltage. This means that, in comparison with the contact-free devices, high voltages can be achieved so that the arrangement is relatively nonsusceptible to trouble.

In a preferred embodiment of the invention the resistance is homogeneous on the entire resistance track. Thus, the sensed voltage is directly proportional to the respective shifting position and the respective rotating position.

In a preferred embodiment of the invention the resistance track is provided for at the inner periphery of a casing box, and the adjusting component is positioned in the center thereof. Thus, an extensive area of the potentiometer is disposable for the resistance track. However, it is also possible to provide for the resistance track on an inner cylindric part and to form as adjusting component a casing enclosing said inner cylindric part. It is not necessary that the element whose movement is to be detected moves the adjusting component. Just as well the element can move the resistance track relative to the adjusting component.

In order to avoid linearity falsifications over the entire rotation or stroke area, several pairs of electrodes are arranged at the edges of the resistance track, respectively, the electrodes being short in comparison with the length of the edges. The electrodes are decoupled by means of diodes. Such an arrangement of electrode pairs is described in DE-OS 32 43 712.

The production of a suitable resistance track by a reverse laminating technique is explained in DE-OS b 33 22 382.

The described rotary potentiometer can be used, for example, with operating devices which carry out rotating and shifting movements and for which a remote indication or feedback on the position is desired. Such operating devices are, for example, control handles, valve operating devices, locking systems or control units for control gears.

Further favourable embodiments of the invention result from the following description.

DETAILED DESCRIPTION OF THE INVENTION

Figure 1:
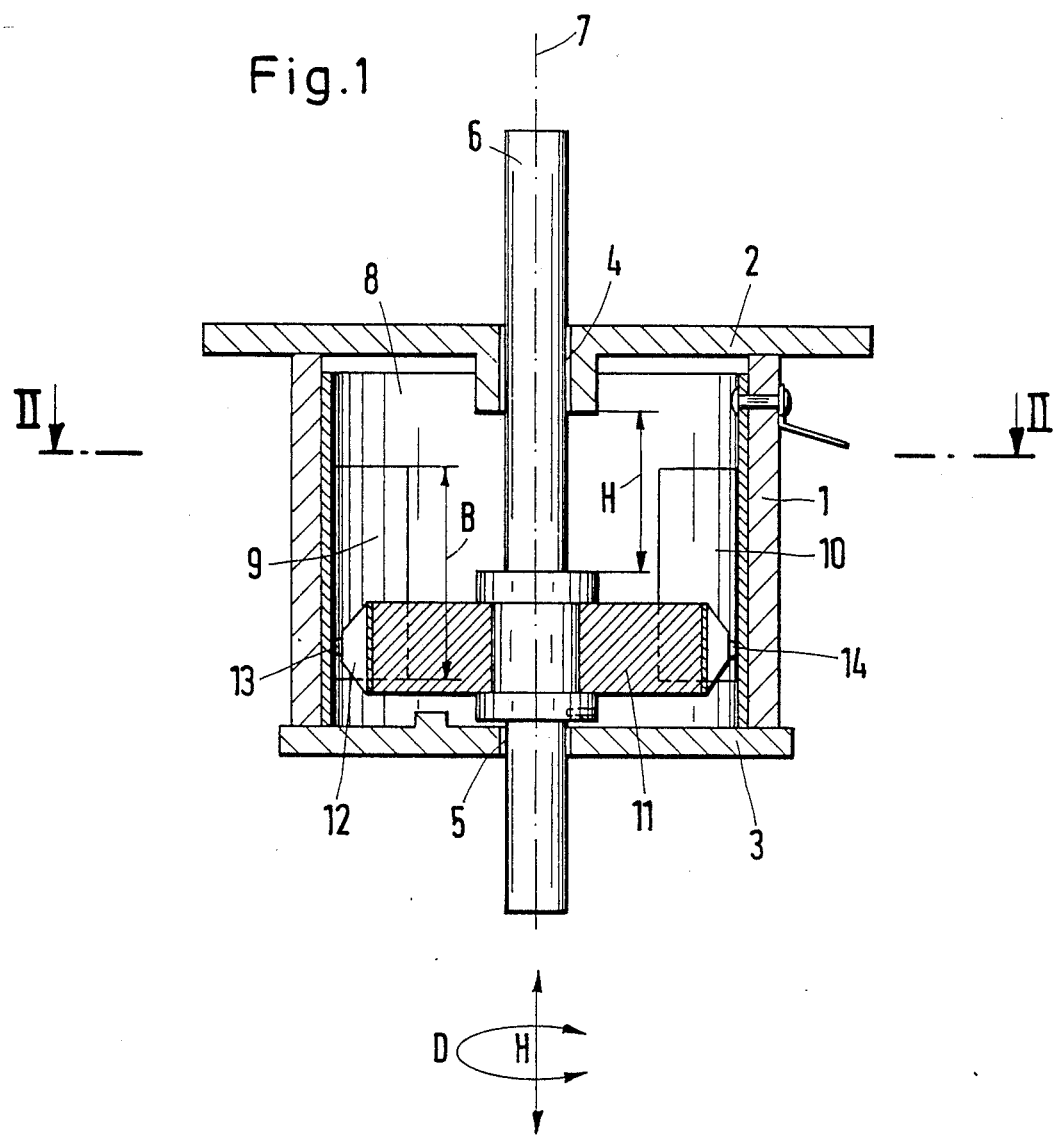
FIG. 1 shows a longitudinal section of a potentiometer.
Figure 2:
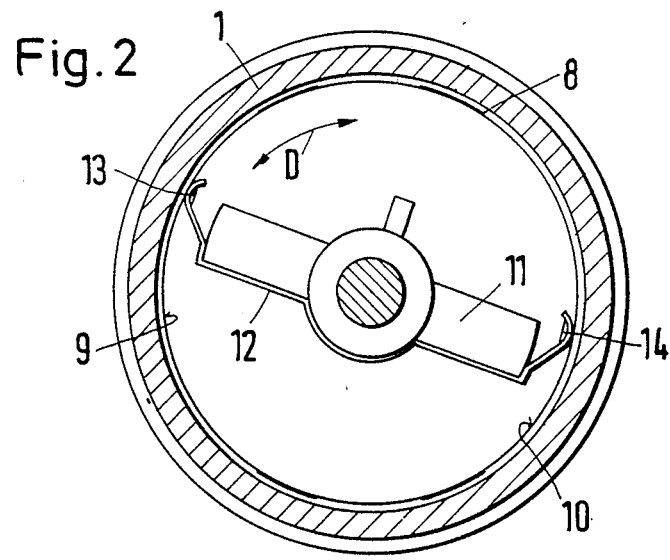
FIG. 2 shows a sectional view along line II—II according to FIG. 1.

As shown in FIGS. 1-2 a cylindric, tubular casing box 1 is covered by two caps 2, 3. At the caps 2, 3 bearings 4, 5 for a shaft 6 are arranged. The shaft 6 extends coaxially along the cylindric axis 7 of the casing box 1.

At the inner side of the casing box 1 a support foil 8 is arranged bearing a resistance track 9 and a tap field 10. The resistance track 9 extends over an angle which is smaller than 180°. It has a breadth B. The tap field 10 is located at the inner periphery of the casing box 1 opposite the resistance track 9 and has the same areal extension as the resistance track.

At the shaft 6 an adjusting component 11 bearing a tap 12 is fixed. A tongue 13 of the tap 12 engages the resistance track 9. A tongue 14 of the tap 12 contacts the tap field 10. The shaft 6 and the tap 12, respectively, are not only rotatable around the cylinder axis 7. They can be shifted also axially by a stroke H. The stroke H is substantially equal to the breadth B of the resistance track 9.

Figure 3:
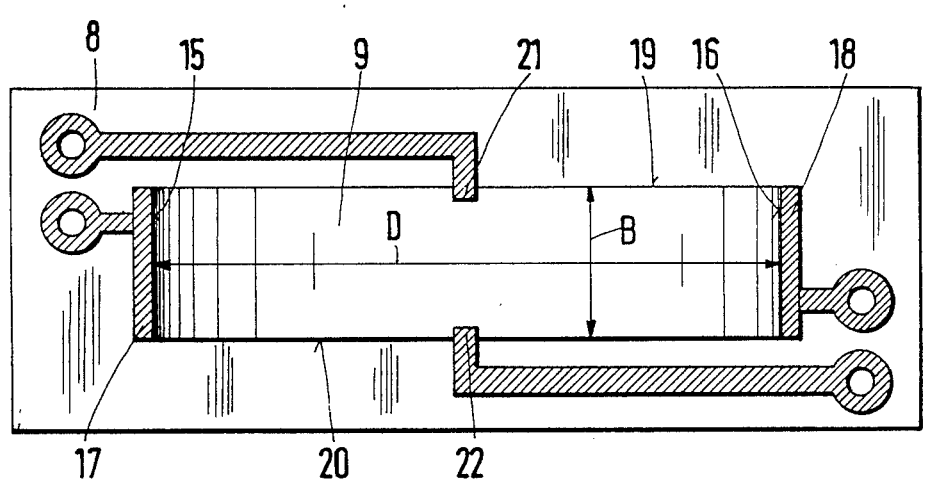
FIG. 3 shows a diagrammatic view of a resistance track in uncoiled position.

In the embodiment shown in FIG. 3 one electrode 17, 18 each is arranged at the edges 15, 16 which are parallel to the cylinder axis 7. The electrodes 17, 18 form an electrode pair. They extend mainly without interruption over the concerned edge 15 or 16, respectively.

At the two edges 19, 20 of resistance track 9 running in circumferential direction of the cylindric casing box 1 electrodes 21, 22 forming a further electrode pair are provided for. The electrodes 21, 22 are closely aligned in comparison with the length of the edges 19, 20.

By means of a commutator 23 the electrode pairs 16, 17; 21, 22 are mutually connected to a constant voltage source 24 supplying a distribution voltage (comp. FIG. 5). In the embodiment according to FIG. 3 sufficient linearity of the resistance variation is provided in the direction of the rotation D. In the direction of the stroke H, however, the resistance variation depends on the respective rotary position. The resistance track according to FIG. 4 shows one possibility for avoiding this.

The resistance track 9 according to FIG. 3 is rectangular. Its longer extension is provided for the rotation D. However, it would be also possible to relate the longer extension to the stroke H.

Figure 4:
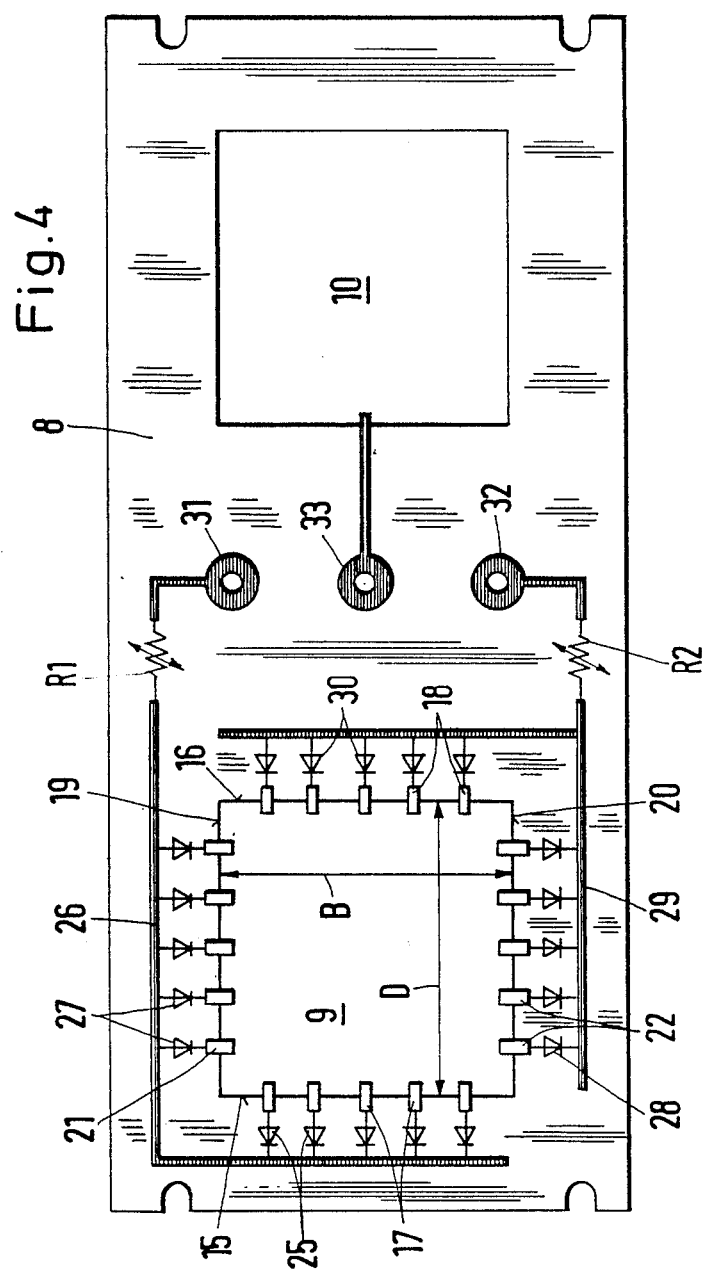
FIG. 4 shows a support with resistance track and tap field in uncoiled position and FIG. 5 a circuit diagram.
Figure 5:
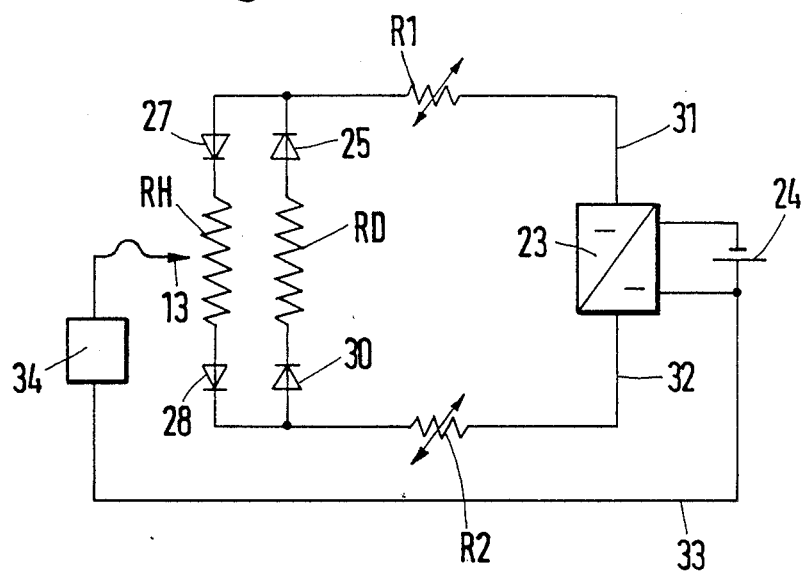

In the embodiment according to FIG. 4 the resistance track 9 is square. At each of the edges 15, 16, 19, 20 a plurality of electrodes 17, 18, 21, 22 is provided for. The electrodes are short in comparison with the length of the edges 15, 16. The contacting surface with which the tongue 13 contacts the resistance track 9 is small in comparison with the distance of the electrodes. The electrodes are at the same distance from each other.

The electrodes 17 are connected to a strip conductor 26 of the support foil 8 by means of diodes 25. The electrodes 21 are connected to the strip conductor 26 by diodes 27. The electrodes 22 are connected to a further strip conductor 29 by means of diodes 28. The electrodes 18 are connected to the strip conductor 29 by means of diodes 30. The diodes 27 and the diodes 28, on the one hand, and the diodes 30 and the diodes 25, on the other hand, are connected in the said direction, however, such that the diodes 25 are connected in an opposite direction referring to the neighbouring diodes 27 of the same strip conductor 26.

Between the strip conductor 26 and its connection 31 a resistor R1 and between the strip conductor 29 and its terminal 32 a resistor R2 is arranged. The resistors R1, R2 compensate for the temperature variation of the diodes.

The square form of the resistance track 9 has the advantage that the same diodes can be used with all electrodes and the same resistors R1, R2 with the two conductor strips, the same voltage conditions resulting with the rotation and the stroke movement.

In the embodiment according to FIG. 4 it is also advantageous that only one further terminal 33 has to be provided for the tap field 10 in addition to the terminals 31, 32.

In FIG. 5 RH is the resistance track's 9 resistance effective in the stroke direction. RD is the resistance track's 9 resistance effective in the direction of rotation.

To the terminal 33 an evaluation circuit 34 is connected mutually detecting the voltage sensed at the resistor RH and the resistor RD at the cycle of the commutator 23, said voltage corresponding to the shifting position of the tap 12 in stroke direction or to the tortion of the tap 12 in the direction of rotation, respectively.

The described rotary shifting potentiometer works substantially as follows:

When the shift 6 is coupled with an element rotating, on the one hand, around an axis and shifting, on the other hand, in the axial direction, the tap 12 carries out a corresponding movement on the resistance track 9. The evaluation circuit 34 detects voltages corresponding to the respective position of rotation and the respective position of shifting. In order to render possible an exact evaluation, the cycle at which the commutator 23 mutually applies the distribution voltage to the electrode pairs 17, 18 and 21, 22, respectively, is faster than the speed of the movement.

In other embodiments it is also possible to extend the resistance track 9 over 360°. Then the tap field 10 can be located in the axial direction of the casing box 1 near the resistance track 9. However, instead of tapping the voltage by means of the tap 12 from the tap field 10, the voltage may be detected from the adjusting component 11 or from the shaft 6 as well by means of an additional tap or slider, or the voltage may be conducted to the casing box 1 by means of a spiral spring.

For the compensation of the temperature-dependent on-state voltage of the diodes the—known—temperature coefficient of the on-state voltage of the diodes in the evaluation circuit 34 can be compensated as well as the temperature-dependent resistors. The temperature compensation can be also achieved by connecting the voltage drop at the diodes over an additional slotted line to the evaluation circuit 34.

With rectangular, non-square, homogeneous resistance tracks 9 the voltage drop at the resistors R1, R2, which serve for compensation, differs so that they compensate the temperature-dependent on-state voltage of the diodes only insufficiently. In order to balance this it is possible to chose different values for the two resistors R1, R2 or different values for the current flowing through them by applying a different distribution voltage.

What is claimed is:

1. Rotary potentiometer comprising a cylindric or partially cylindric resistance track having two edges parallel to the axis of a cylinder corresponding to the resistance track which are provided with at least one first pair of electrodes applying voltage to the resistance track, and comprising a tap which engages the resistance track and which is fixed to an adjusting component rotatable around the cylinder axis, wherein the adjusting component is axially movable by a stroke axial to the cylinder axis relative to the resistance track, wherein the axial breadth of the resistance track is substantially equal to the stroke of the adjusting component, and wherein at the resistance track's two edges running in circumferential direction of the cylinder at least one second electrode pair is provided for mutually connecting with respective voltage sources.

2. Rotary potentiometer according to claim 1, wherein the resistance track is homogeneous.

3. Rotary potentiometer according to claim 1 or 2 wherein the resistance track is disposed at the inner periphery of a casing box and the adjusting component is positioned in the center thereof.

4. Rotary potentiometer according to claim 3, wherein the resistance track extends over less than 180° and the tap relates to a tap field having the same surface as the resistance track and being arranged diametrically to the resistance track.

5. Rotary potentiometer according to claim 3,, wherein electrode pairs are arranged at the edges of the resistance track, the electrodes being short in comparison with the length of the edges, and wherein the electrodes are decoupled by means of diodes.

6. Rotary potentiometer according to claim 5, wherein resistors with a positive temperature coefficient are provided for the compensation of the temperature-dependent on-state voltage of the diodes.

7. Rotary potentiometer according to claim 5, wherein a contacting surface with which the tap engages the resistance track is smaller than the distance between neighboring electrodes.

8. Rotary potentiometer according to claim 6, wherein a contacting surface with which the tap engages the resistance track is smaller than the distance between neighboring electrodes.

9. Rotary potentiometer according to claim 1 or 2, the contacting surface with which the tap engages the wherein the resistance track when decoiled is square.

10. Rotary potentiometer according to claim 1, wherein electrode pairs are arranged at the edges of the resistance track, the electrodes being short in comparison with the length of the edges, and wherein the electrodes are decoupled by means of diodes.

* * * * *